Patented June 29, 1926.

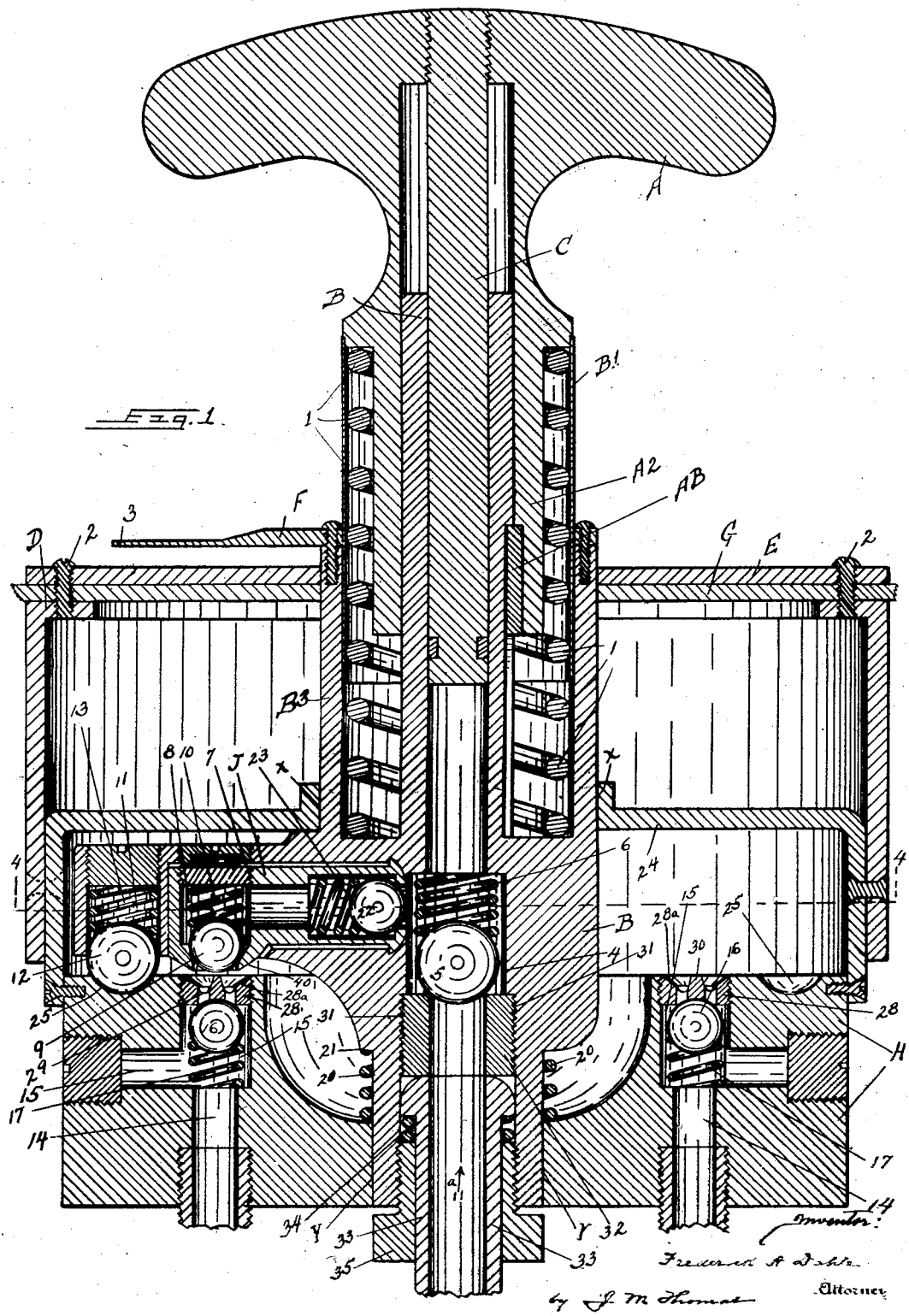

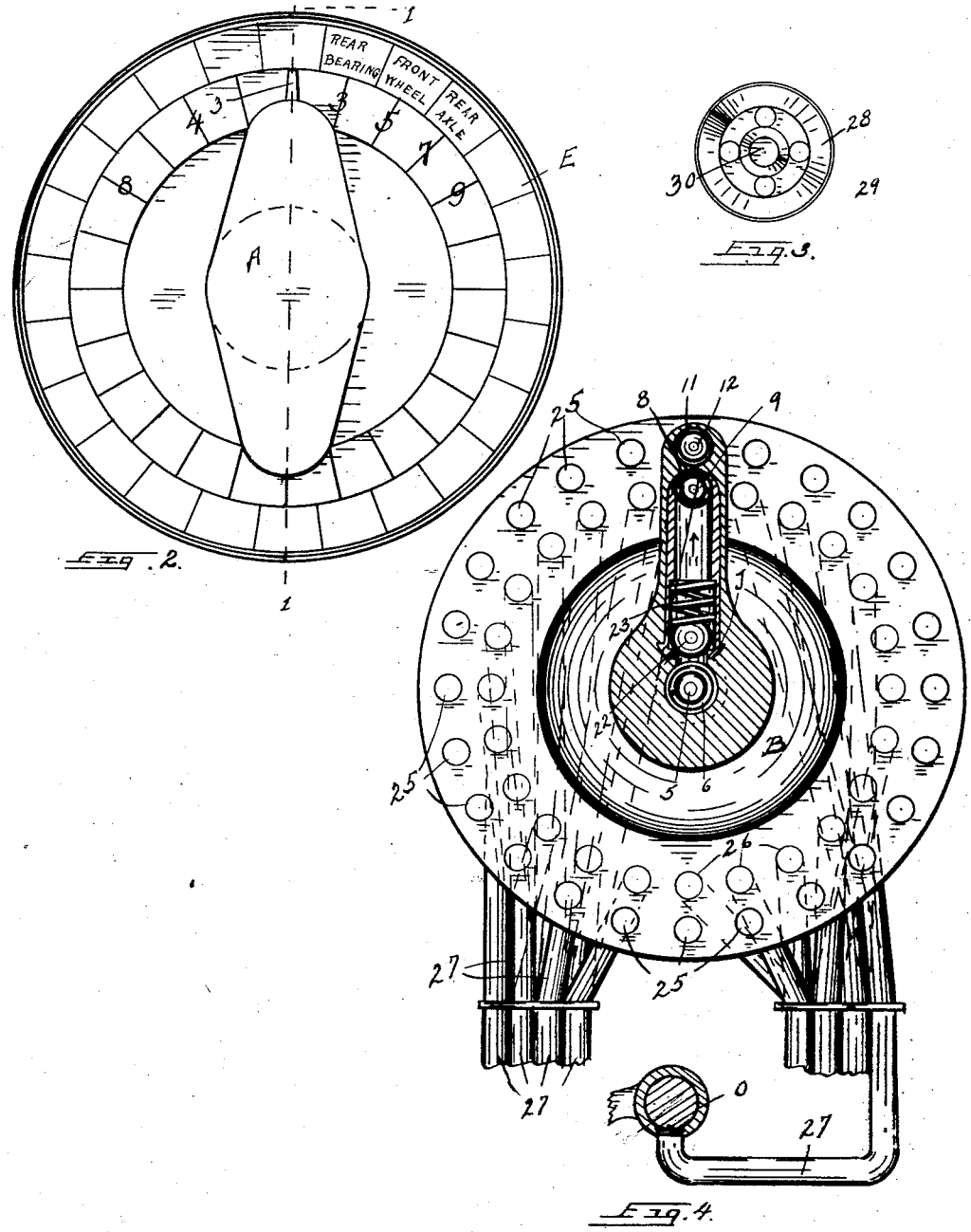

1,590,500

UNITED STATES PATENT OFFICE.

FREDERICK A. DAHLE, OF LOGAN, UTAH.

OILING DEVICE.

Application filed March 1, 1926. Serial No. 91,353.

My invention relates to lubricating devices and has for its object to provide a new and compact grease or oil gun which is to be secured at some convenient place on, and by which different parts of machinery may be independently and quickly oiled without the inconvenience to the operator of reaching to places difficult to oil and without soiling the clothing and hands of the oiler.

These objects I accomplish with the device illustrated in the accompanying drawings in which similar letters and numerals of reference indicate like parts throughout the several views, and as described in the specification forming a part of this application and pointed out in the appended claims.

In the drawings in which I have shown the best and most preferred embodiment of my invention, Figure 1 is a longitudinal section on line 1—1 of Figure 2. Figure 2 is an end elevation of the device. Figure 3 is an end elevation of the sleeve plug. Figure 4 is a transverse section on line 4—4 of Figure 1, with parts cut away and other parts shown in dotted lines, and showing one distributing tube in elevation.

I have shown in the drawings the hollow handle A having one end portion $A^2$ slidable on and within a portion of a member B and fastened on said member by the splined key AB. A spiral spring 1 is carried on the handle A. A cylindrical casing $B^1$ is carried between said spring 1 and a cylindrical casing $B^3$, which is a portion of the said member B. A plunger or piston C is closely fitted within said member B and is secured at one end to said handle A, and is suitably packed to prevent leakage of the oil. An inwardly flanged cylindrical casing D is secured to a disk plate E by the tap screws 2, and which casing is connected with a portion of the member H. An index plate F, having a pointer 3 formed thereon, is secured on the end of said member B. Numerals from one up, with legends, are shown on the outer face of said disk plate E. The said tap screws 2 are passed through the instrument board G, of the mechanism to be oiled, to secure the device rigidly in place. A member H is carried on the inner end of the member B, within which member H the inner end portion of the member B is movable. The bearings for said movement are shown at X and Y. A central bore 4 is provided within the member B, somewhat larger than the piston chamber, and within which a ball valve 5 is operated. The said ball valve 5 is normally held in place by the spring 6 which is also carried in said bore 4. Within a radially disposed hole 7 the casing J is carried, and which is transversely bored, as at 8, and within which bore the ball valve 9 and its spring 10 are carried and operated. Another transverse bore 11 is provided in said member B, and within which the ball 12 and its spring 13 are carried and operated. The said member H is transversely bored, as at 14 and 15, to form oil conduits, and within which bores the ball 16 and the spring 17 are carried and operated.

A spring 20 is carried on the member B between a shoulder 21 formed on said member and the adjacent member H to allow limited longitudinal movement of the member B within the member H. A ball valve 22 is carried in a central bore provided within the member J, which ball valve is normally held in its seat by the spring 23. An inwardly flanged cylindrical casing 24 is secured to said member H, and with another portion of said casing 24 forming the said bearing X for the member B. The egress opening of the bore 8 is given a cone shape to form a seat on its inner side for the ball 9, and a tapered frusto-conically shaped outer face 40 which seats in the plug 28 when the cone shaped portion 40 is moved into contact with the seat formed portion $28^a$ of the sleeve plug 28 by pushing the member B toward the member H. When said contact has been made by said movement the ball 9 will be moved out of its seat by the central portion 30 of the sleeve plug 28. In the face of said member H a plurality of recesses 25 are formed within which the ball 12 is adapted to engage, and which recesses are spaced apart and positioned in a circle concentric with the axis of the member. Other circular recesses 26 are cut in the face of the member H concentrically spaced from each other and from the recess 25 to form oil ports through said member H. A plurality of tubes 27 are secured in the rear face of said member H, each of which leads to or is connected with a portion of the mechanism requiring lubrication, as, for instance, to a bearing O, as shown in Figure 4. A sleeve plug member 28 is screwed into the bore 14 in the member H to lift the ball 9 so that the oil will pass around it and the said plug 28 is provided with ports 29 to allow the oil to flow through the conduit 14. A central portion 30 of the sleeve plug 28 is on the plane of the inner face of said member H to lift the ball 9 from its seat in the member J. The ball 9 will be seated by the spring 10 and prevent the flow of oil except when the bore 8 and any one of the bores 15 are in alinement. In that position the ball 9 will be unseated by pushing the member B, which carries said ball 9, toward the member H. The said member B has its bore enlarged, as at 31, to receive the sleeve plug 32, which plug forms the seat for the ball valve 5. Within the said bore 31 a packing sleeve 33 is carried on the spring 34. The said spring is held with said bore 31 by the packing nut 35 which is screwed into said bore, and through which the oil supply is drawn by the suction of the piston C.

The operation of my device is as follows:
The oil is drawn through the bore 4 by the suction of the piston C, as indicated by the arrow $a$. The suction of the picton C will raise the ball valve 5 and compress the spring 6 until the conduits 7 and 8 are filled by the movements of the handle A. The handle A and member B are rotated on the member H and its connected elements until the index pointer 3 indicates that the centering ball 12 is seated in the desired recess 25, which position is indicated on the disk plate E. The handle A is pushed toward the instrument board G and compresses the spring 1. The oil within the bore 4 will be forced through the bore in the casing J and compress the springs 23 and 17 and force the oil around the balls 22, 9 and 16 and through the tube 27 to the desired place requiring lubrication. The device may be rotated to other positions where the ball 12 is in the recess 25 indicated as in alinement with tube 27 which connects with the place to be lubricated, and when the handle is operated the oiling will be repeated for that place.

Having thus described my invention, I desire to secure by Letters Patent and claim:

1. An oiling device comprising a dial plate adapted to be secured on the mechanism to be lubricated; a rotatable handle longitudinally slidable through said plate, and having a longitudinal central bore therein; a plunger operable within the bore of said handle; a flanged member within which said handle is operated and within which a portion of said plunger is operated; an oil conduit radially bored in said member; a ball valve operable in said radial conduit; means to seat said ball valve; means to position said conduit; an oil port cut in said flanged member and connected with said radial conduit; a distributing member having a plurality of oil conduits bored therein, each of which is adapted to have said oil port brought into alinement therewith; means to secure said distributing member to said dial plate; and a plurality of tubes, each of which is secured in one of the oil conduits of the distributing member.

2. A lubricating device comprising a dial plate secured on a mechanism to be oiled; an oil pump rotatably and longitudinally movable in said dial plate; a positioning member connected with said pump and having a radially disposed oil conduit bored therein; means to regulate the flow of oil through said member; a distributing member secured to said dial plate and having a plurality of oil conduits bored therein; valves to regulate the flow of oil through said conduits; and oiling tubes in connection with each of the last mentioned conduits.

In testimony whereof I have affixed my signature.

FREDERICK A. DAHLE.